UNITED STATES PATENT OFFICE

WINFRID HENTRICH, OF WIESDORF-ON-THE-RHINE, ERNST TIETZE, OF COLOGNE-ON-THE-RHINE, ANTON OSSENBECK, OF COLOGNE-MULHEIM, AND PETER BACKES, OF COLOGNE-ON-THE-RHINE, GERMANY, ASSIGNORS TO GENERAL ANILINE WORKS INC., OF NEW YORK, N. Y., A CORPORATION OF DELAWARE

DIAZO-AMINO COMPOUNDS

No Drawing. Application filed July 9, 1929, Serial No. 377,076, and in Germany July 14, 1928.

The present invention relates to diazo-amino compounds. More particularly it relates to compounds of the probable general formula:

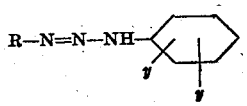

wherein R stands for the residue of a diazotizable aromatic amine suitable for producing azodyestuffs, such as a benzene nucleus, a naphthalene-, anthraquinone-, or carbazol nucleus, one $y$ stands for a carboxylic acid group, the other $y$ stands for a carboxylic acid- or a sulfonic acid group, $y$ being attached either directly to a carbon atom of the benzene nucleus or by means of a chain, for example by an alkylene group or the group NH-CO, and wherein the nuclei may be further substituted by substituents selected from the group consisting of alkyl, alkoxy, halogen, hydroxyl, the nitro group and the substituted amino group.

Our new compounds are obtainable by causing to react upon each other, advantageously in about molecular quantities, a diazonium compound obtained in the usual manner from a diazotizable aromatic amine suitable for producing dyestuffs and a primary amine of the general formula

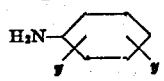

wherein one $y$ stands for a carboxylic acid group and the other $y$ stands for a carboxylic acid- or a sulfonic acid group, $y$ being attached either directly to a carbon atom of the benzene nucleus or by means of a chain, and wherein the nucleus may be further substituted by substituents selected from the group consisting of alkyl, alkoxy, halogen, hydroxyl, the nitro group and the substituted amino group.

As acids falling within the scope of this general formula may be given for example, sulfo-amino-benzoic acids, sulfoaminotoluic acids, sulfoaminophenyl acetic acids (compare German Patent No. 289,028), aminophthalic acids, aminoisophthalic acids and the like, or substitution products of the same or of analogous compounds.

In carrying out the invention, we prepare a diazo solution by diazotizing in the usual manner an aromatic amine of the kind referred to above with sodium nitrite and hydrochloric acid and introduce the same into an aqueous solution of an acid of the above defined formula

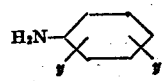

The formation of the new compounds proceeds extremely smoothly either in alkaline, neutral and weakly acid aqueous solution. From the concentrated solution the new diazoamino compounds partially separate during the reaction, the separation can be completed by the addition of salt. After carefully drying, the new products are obtained generally in form of greyish to orange crystalline powders. The action of acid reagents, such as formic acid, acetic acid, oxalic acid and sodium bisulfate, on the aqueous solutions of the salts of the new diazoamino compounds causes in a very short time a smooth and quantitative reconversion into the diazo compound and the amine of the formula:

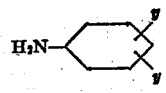

used in the formation of the diazo-amino compound. Furthermore, the new products are stable towards heat, percussion, friction and neutral or alkaline substances, such as Glauber's salt, sodium carbonate, potassium carbonate and the like.

The new compounds are intended to find application in dyeing and printing and also for combating insect pests.

Part of the compounds falling within the scope of the general formula above identified are obtainable by reacting with an aromatic diazo-compound which is substituted by at least one carboxylic acid and one sulfonic acid or two carboxylic acid groups, which acid groups may be attached to the benzene nucleus either directly or by means of chains, upon such a primary amine as does not couple with the diazo compound to form an azo dyestuff, that means upon such amines as are substituted in p-position to the amino group or, in case the p-position is not substituted, are sufficiently acid-substituted. This method of carrying out our process is equivalent to that disclosed above.

The following examples will illustrate the invention, without limiting it thereto:

*Example 1.*—1/10 mol aniline-4-sulfonic acid is diazotized in the usual manner with sodium nitrite and hydrochloric acid, and the diazo solution is introduced while stirring into a neutral solution of the calculated quantity of 2-amino-4-sulfo-benzoic acid in the presence of sodium acetate, care being taken that the temperature does not exceed +10° C. When the diazo compound can no longer be detected, the solution is rendered alkaline by the addition of sodium carbonate. The new compound having in its free state the following formula:

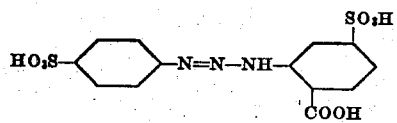

is salted out, filtered and dried by gently heating. It is obtained in the form of yellowish crystalline leaflets which are easily soluble in water.

*Example 2.*—127.5 parts by weight of 3-chloro-aniline are converted in the customary manner by means of hydrochloric acid and sodium nitrite into the 3-chloro-phenyl-diazonium chloride solution. This solution is run at 0–10° C. with stirring into a neutral solution of rather more than the calculated quantity of 2-amino-4-sulfobenzoic acid in the presence of sodium acetate. Stirring is continued for about one hour, the free diazoamino acid of the formula:

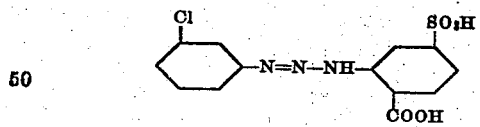

which separates abundantly, is dissolved by means of an excess of dilute caustic soda, and the disodium salt is salted out with sodium chloride. The disodium salt, precipitated in the form of yellow crystals, is centrifuged and dried with gentle heat. It is readily soluble yellow powder, the yield is almost quantitative.

*Example 3.*—In an analogous manner there are obtained from the diazo compound from 142 parts by weight of 4-chloro-2-amino-1-methyl-benzene and the calculated quantity of 2-amino-4-sulfobenzoic acid, 395 parts by weight, that is 95% of the theoretical yield, of the disodium salt of the diazoamino compound.

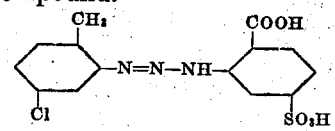

*Example 4.*—The diazonium chloride solution obtained from 142 parts by weight of 4-chloro-2-amino-1-methyl-benzene, 300 parts by weight of crude hydrochloric acid and 69 parts by weight of sodium nitrite is caused to act with a slight excess of an aqueous solution of 3-amino-5-sulfobenzoic acid. On rendering the solution alkaline with caustic soda and salting out there is obtained a disodium salt of the diazoamino compound of yellow color, good solubility and stability. The yield amounts to about 90% of the theoretical.

In an analogous manner there can be used substitution products of the 3-amino-5-sulfobenzoic acid, such as the 3-amino-5-sulfo-4-hydroxy-benzoic acid or the 5-amino-3-sulfo-2-hydroxy-benzoic acid or the alkyl ethers thereof.

*Example 5.*—On causing the diazonium salt solution obtained in example 4 to act with a slight excess of the neutral solution of 2-amino-5-sulfobenzoic acid in the presence of sodium acetate, there is obtained a compound of the formula:

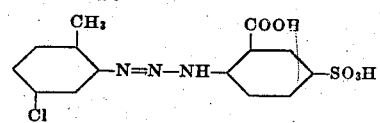

The alkali metal salts of this compound are extremely soluble and their separation by salting out with sodium chloride is not possible. In this case it is advantageous to separate the free acid. The yield is almost quantitative.

*Example 6.*—On causing the diazonium salt solution described in Example 4 to act with a solution of 5-sulfo-4-methyl-3-amino-benzoic acid (neutral or weakly acid with acetic acid) there is obtained with a good yield, after rendering the reaction of the solution alkaline and salting out, the yellow disodium salt of the formula:

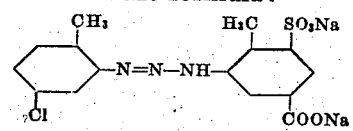

*Example 7.*—When the diazonium chloride solution produced from 2-chloro-aniline is caused to act with a neutral sodium salt solution of 1-aminobenzene-3.5-dicarboxylic acid:

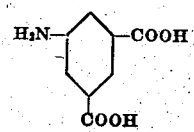

the normal diazoamino compound is precipitated immediately as a yellow insoluble powder. The latter is filtered, dissolved in water with two molecular proportions of caustic soda lye and salted out with sodium chloride. The disodium salt is thus obtained as a yellow powder of satisfactory solubility and good capacity for being split up.

The products of the action of diazonium salt solutions on sodium salt solutions of 5-aminophthalic acid:

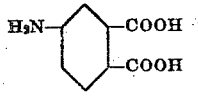

behave in an exactly analogous manner.

Example 8.—1 mol each of: 4-chloro-2-amino-1-methoxybenzene, 4-nitro-2-amino-1-methylbenzene, 5-nitro-2-amino-1-methylbenzene, 3-nitro-4-amino-1-methylbenzene, 5-chloro-2-amino-1-methylbenzene, 3-chloro-2-amino-1-methylbenzene, 6-chloro-2-amino-1-methylbenzene, 4-amino-3-chloro-1-methylbenzene, 5-chloro-2-amino-1-methylbenzene, 4.5-dichloro-2-amino-1-methylbenzene, 3.6-dichloro-4-amino-1-methylbenzene, 6-nitro-4-methoxy-3-amino-1-methylbenzene 6-benzoylamino-4-chloro-3-amino-1-methoxy-benzene, 2.5-dichloro-1-aminobenzene, 4.6-dichloro-2-amino-1-methylbenzene, are respectively converted in the customary manner in hydrochloric acid solution by means of sodium nitrite into the diazonium chloride. Each of these solutions is caused to act with a neutral solution of 265 parts by weight (rather more than the calculated quantity) of 2-amino-4-sulfobenzoic acid. After some time the solutions are rendered alkaline with caustic soda or sodium carbonate and the reaction product is salted out with about 20% of sodium chloride. When the separation is complete, the product obtained is filtered, centrifuged and dried at 60° C. in vacuo. Thus are obtained from all 15 diazonium salt solutions the corresponding diazoaminobenzene sulfocarboxylic acids of the type:

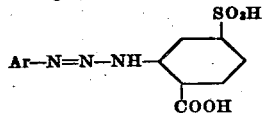

(Ar meaning the benzene nucleus of the starting diazo-compounds), in the form of their sodium salts. These compounds are yellow to orange powders, readily soluble in water. All of them are very stable towards alkalies, but are decomposed into their components quickly and smoothly by acid reagents. The yields vary between 85 and 95%.

In the examples quoted any desired other amines of the benzene, naphthalene or diphenyl series and the like, also those of the heterocyclic series, such as for example, amino-carbazoles, can be used as the diazo components. Furthermore, aminoanthraquinone, such as the 1-amino or 1-amino-4-benzoyl-aminoanthraquinone and also any desired aminoazo compounds, such as for example:

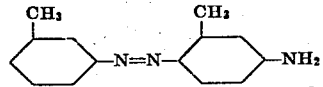

and the like display an analogous behaviour.

Example 9.—142 parts by weight of 5-chloro-2-amino-1-methylbenzene are diazotized in the customary manner with 300 parts by weight of crude hydrochloric acid and 69 parts by weight of sodium nitrite and the diazo-solution is slowly run into an aqueous solution of the calculated amount (1 mol) of the sodium salt of 2-amino-5-sulfobenzoic acid. Then 40 parts by weight of magnesia are added and the mixture is stirred until a test no longer couples with naphtholsulfonic acids. The magnesium salt of the diazoamino compound of the formula:

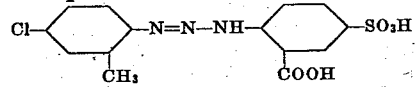

separates slowly. It is filtered and transformed into its sodium salt by means of sodium carbonate.

Instead of magnesia other similarly acting substances may be used, such as magnesium carbonate, barium or calcium carbonate of pyridine and its homologues.

Example 10.—A diazonium chloride solution prepared in the usual manner from 188 parts by weight of 4-nitro-1-naphthylamine is slowly introduced into an aqueous solution of rather more than the calculated quantity of the sodium salt of 5-sulfo-2-aminobenzoic acid containing sodium acetate. When the diazo compound can no longer be detected, the solution is rendered alkaline by the addition of caustic soda lye, and the diazo amino compound having in its free form the following formula:

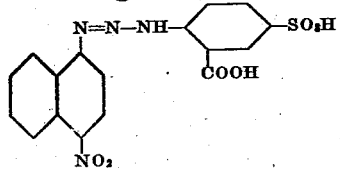

is salted out by the addition of common salt. It is a yellowish colored stable, easily soluble powder, the yield is nearly quantitative.

Example 11.—A diazo solution prepared in the usual manner from 1 mol 4-chloro-2-amino-1-methylbenzene is run into a neutral solution prepared from the calculated amount of 4-amino-2-sulfo-oxanilic acid. The new diazo-amino compound of the formula:

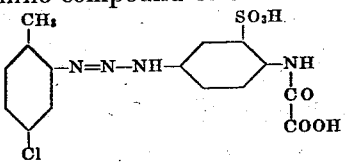

*Example 12.*—167 parts by weight of 1-aminocarbazol are diazotized in the customary manner in aqueous hydrochloric acid solution with sodium nitrite. The solution is run into a solution prepared from the equivalent quantity of 4-sulfo-2-amino-benzoic acid. When the reaction is complete, the solution is rendered alkaline and the diazo-amino compound having in its free state the following formula:

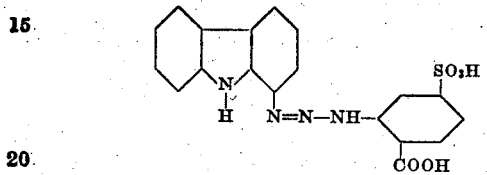

is salted out. It is obtained in form of a light brown crystalline stable powder, easily soluble in water. The yield is 70–80% of theory.

*Example 13.*—1 mol of α-aminoanthraquinone is diazotized and the diazo-solution is run into a neutral solution prepared from 1 mol 4-sulfo-2-amino-benzoic acid, while cooling. The solution is rendered alkaline and the new compound is salted out. In its free form it has the following formula:

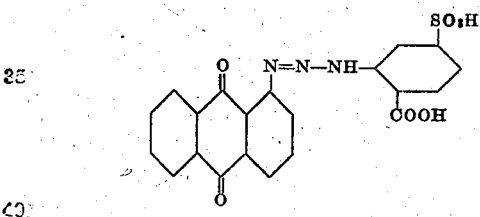

The compound is stable and easily soluble in water.

We claim:

1. As new products the compounds of the probable general formula:

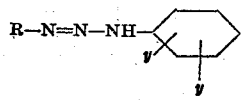

wherein R stands for the residue of a diazotizable aromatic amine suitable for producing azodyestuffs, one y stands for a carboxylic acid group and the other y stands for a substituent of the group consisting of the carboxylic acid and sulfonic acid groups and wherein the nuclei may be further substituted by substituents selected from the group consisting of alkyl, alkoxy, halogen, hydroxyl, the nitro group and substituted amino group, being generally greyish to orange crystalline powders, stable towards heat, percussion, friction and neutral and alkaline substances, and being split up in aqueous solution by acid reacting agents into the two starting components.

2. As new products the compounds of the probable general formula:

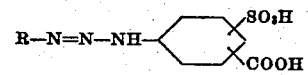

wherein R stands for a benzene nucleus which may be substituted by substituents of the group consisting of alkayl, alkyloxy, the hydroxy-group, the nitro-group, a substituted amino group and halogen, and wherein the second benzene nucleus may be further substituted by substituents selected from the group consisting of alkyl, alkoxy, halogen, hydroxyl, the nitro group and substituted amino group, being generally greyish to orange crystalline powders, stable towards heat, percussion, friction and neutral and alkaline substances, and being split up in aqueous solution by acid reacting agents into the two starting components.

3. As new products the compounds of the probable general formula:

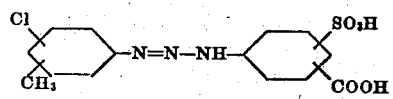

being generally greyish to orange crystalline powders, stable towards heat, percussion, friction and neutral and alkaline substances, and being split up in aqueous solution by acid reacting agents into the two starting components.

4. As a new product the compound of the formula:

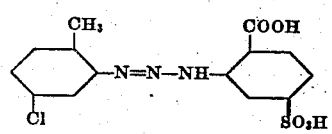

being a yellowish crystalline powder, stable towards heat, percussion, friction and neutral and alkaline substances, and being split up in aqueous solution by acid reacting agents into one molecule of diazotized 4-chloro-2-amino-1-methylbenzene and one molecule of 2-amino-4-sulfobenzoic acid.

In testimony whereof we have hereunto set our hands.

WINFRID HENTRICH. [L. S.]
ERNST TIETZE. [L. S.]
ANTON OSSENBECK. [L. S.]
PETER BACKES. [L. S.]